US011261932B2

(12) United States Patent
Kadokura et al.

(10) Patent No.: US 11,261,932 B2
(45) Date of Patent: Mar. 1, 2022

(54) SHOCK ABSORBER (71) Applicant: HITACHI AUTOMOTIVE SYSTEMS, LTD., Ibaraki (JP)

(72) Inventors: Kosuke Kadokura, Ebina (JP); Yohei Katayama, Yokohama (JP); Takao Nakadate, Yamato (JP); Osamu Yuno, Yokohama (JP); Shunsuke Mori, Yokohama (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 76 days.

(21) Appl. No.: 16/633,004

(22) PCT Filed: Jul. 24, 2018

(86) PCT No.: PCT/JP2018/027708
§ 371 (c)(1),
(2) Date: Jan. 22, 2020

(87) PCT Pub. No.: WO2019/022075
PCT Pub. Date: Jan. 31, 2019

(65) Prior Publication Data
US 2020/0166097 A1   May 28, 2020

(30) Foreign Application Priority Data

Jul. 27, 2017   (JP) .............................. JP2017-145618

(51) Int. Cl.
*F16F 9/34* (2006.01)
*F16F 9/516* (2006.01)
(Continued)

(52) U.S. Cl.
CPC ................ *F16F 9/516* (2013.01); *F16F 9/19* (2013.01); *F16F 9/34* (2013.01); *F16F 9/061* (2013.01);
(Continued)

(58) Field of Classification Search
CPC ..... F16F 9/50; F16F 9/187; F16F 9/348; F16F 9/446; F16F 9/3405; F16F 9/34
(Continued)

(56) References Cited

U.S. PATENT DOCUMENTS

| 7,757,826 B2* | 7/2010 | Hayama .................. F16F 9/465 188/282.2 |
| 7,997,394 B2* | 8/2011 | Yamaguchi ............. F16F 9/465 188/282.2 |

(Continued)

FOREIGN PATENT DOCUMENTS

| JP | 2008-249107 | 10/2008 |
| KR | 10-2017-0075764 | 7/2017 |

OTHER PUBLICATIONS

Translation of Office Action dated Oct. 28, 2020 in corresponding Korean Patent Application No. 2019-7028179.
(Continued)

*Primary Examiner* — Christopher P Schwartz
(74) *Attorney, Agent, or Firm* — Wenderoth, Lind & Ponack, L.L.P.

(57) ABSTRACT

The present invention provides a shock absorber capable of improving responsiveness during an extension stroke without leading to an increase in an axial length. A shock absorber includes a chamber provided on a one-side end of a pilot valve and disposed in communication with a cylinder upper chamber, a communication passage configured to establish communication between the chamber and a cylinder lower chamber via a compression-side passage, and a check valve configured to permit hydraulic fluid in the communication passage to flow into the cylinder lower chamber during an extension stroke.

8 Claims, 5 Drawing Sheets

(51) Int. Cl.
  *F16F 9/19* (2006.01)
  *F16F 9/06* (2006.01)
(52) U.S. Cl.
  CPC ........... *F16F 9/065* (2013.01); *F16F 2222/12* (2013.01); *F16F 2228/066* (2013.01)
(58) Field of Classification Search
  USPC ......... 188/266.2, 266.3, 266.5, 282.1–282.5, 188/282.8, 322.13, 322.15
  See application file for complete search history.

(56) References Cited

U.S. PATENT DOCUMENTS

| | | | |
|---|---|---|---|
| 8,544,619 B2 * | 10/2013 | Yamaguchi | F16F 9/3485 188/285 |
| 10,634,207 B2 * | 4/2020 | Yuno | F16F 9/3214 |
| 2008/0236966 A1 | 10/2008 | Yamaguchi | |
| 2017/0268595 A1 | 9/2017 | Inagaki et al. | |
| 2020/0191229 A1 * | 6/2020 | Mori | F16F 9/446 |

OTHER PUBLICATIONS

International Search Report dated Oct. 23, 2018 in International (PCT) Application No. PCT/JP2018/027708 with English translation.
Written Opinion of the International Searching Authority dated Oct. 23, 2018 in International (PCT) Application No. PCT/JP2018/027708 with English translation.

* cited by examiner

SHOCK ABSORBER

TECHNICAL FIELD

The present invention relates to a shock absorber that generates a damping force by controlling a flow of hydraulic fluid with respect to a stroke of a piston rod.

BACKGROUND ART

For example, PTL 1 discloses a shock absorber including a damping force generation mechanism built in a cylinder. In this shock absorber, hydraulic fluid in a plunger bore flows out into a piston lower chamber via a check valve during an extension stroke of a piston rod. This allows the volume of the hydraulic fluid to be compensated for by an amount corresponding to a movement of a compression-side valve body, thereby being able to improve responsiveness of an extension-side valve body.

CITATION LIST

Patent Literature

[PTL 1] Japanese Patent Application Public Disclosure No. 2008-249107

SUMMARY OF INVENTION

Technical Problem

The shock absorber discussed in PTL 1 uses a check valve with a coil spring disposed along an axial direction and therefore should secure a certain amount of a stroke of the coil spring to reduce a pressure loss, thereby raising a problem of leading to an increase in an axial length of a piston bolt and thus an increase in a total length of the shock absorber.

An object of the present invention is to provide a shock absorber capable of improving the responsiveness during the extension stroke without leading to the increase in the axial length.

Solution to Problem

According to one aspect of the present invention, a shock absorber includes a cylinder sealingly containing hydraulic fluid therein, a piston slidably disposed in the cylinder and dividing an inside of this cylinder into a cylinder upper chamber and a cylinder lower chamber, a piston rod having one end coupled with the piston and the other end extending out of the cylinder, an extension-side passage and compression-side passage provided in the piston, an extension-side main valve provided in the extension-side passage, an extension-side back-pressure chamber configured to adjust a valve-opening pressure of the extension-side main valve, a compression-side main valve provided in the compression-side passage, a compression-side back-pressure chamber configured to adjust a valve-opening pressure of the compression-side main valve, a common passage configured to establish communication between the extension-side back-pressure chamber and the compression-side back-pressure chamber, a valve body movably provided in the common passage, a valve spring configured to bias the valve body in a valve-opening direction, a pilot valve configured to control a flow of the hydraulic fluid in the common passage, an actuator configured to control a movement of the valve body, a chamber provided on a one-side end of the pilot valve and disposed in communication with the cylinder upper chamber, a communication passage configured to establish communication between the chamber and the cylinder lower chamber via the compression-side passage, and a check valve configured to permit the hydraulic fluid in the communication passage to flow into the cylinder lower chamber during an extension stroke.

According to the one aspect of the present invention, the shock absorber can improve the responsiveness during the extension stroke without leading to the increase in the axial length.

DESCRIPTION OF EMBODIMENTS

First Embodiment

A first embodiment of the present invention will be described with reference to the attached drawings.

Figure 1:
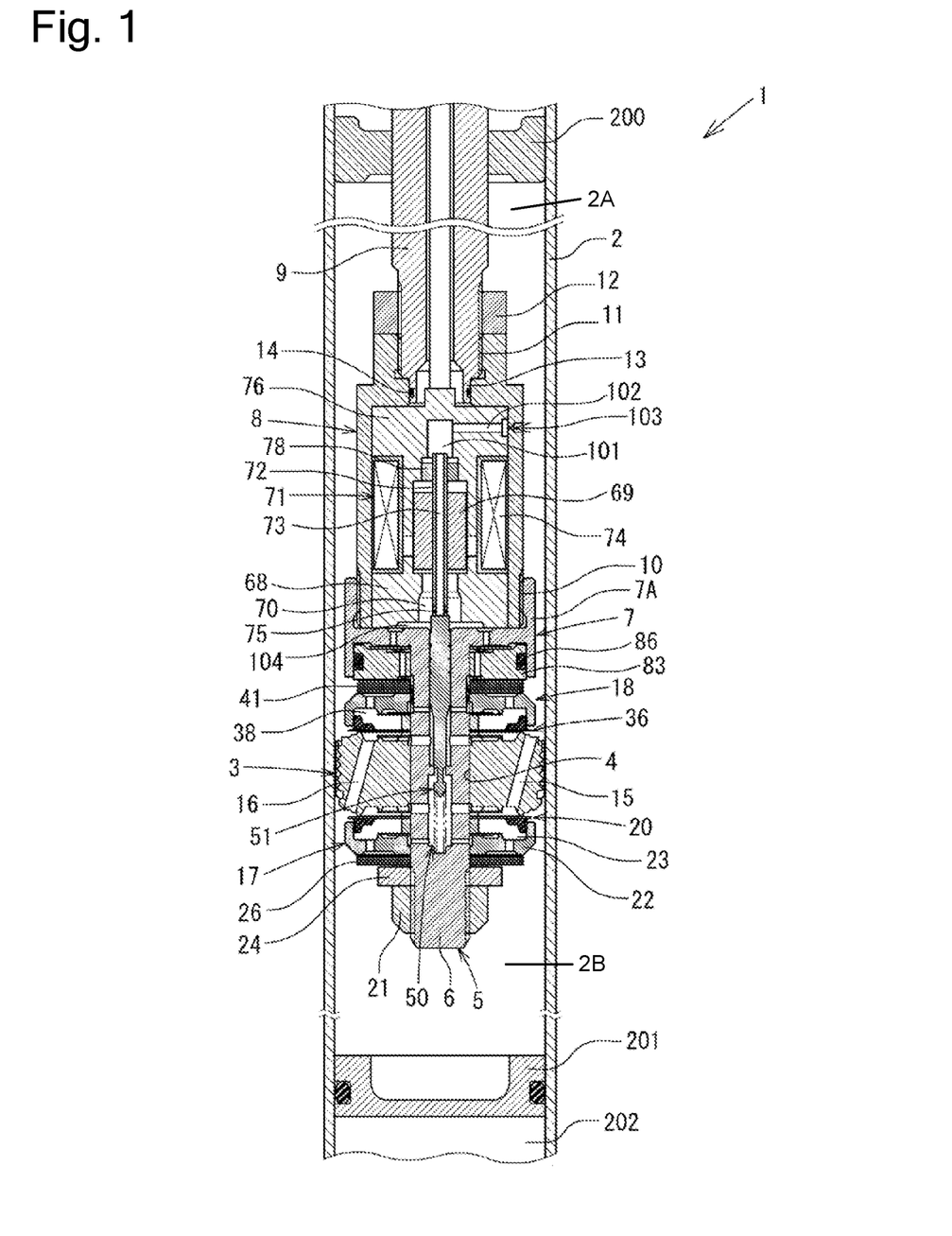
FIG. 1 is a cross-sectional view of main portions of a shock absorber according to a first embodiment.

FIG. 1 is a cross-sectional view of main portions of a shock absorber 1 according to the first embodiment. In the following description, an upward direction (an upper side) and a downward direction (a lower side) in FIG. 1 are defined to be an upward direction (an upper side) and a downward direction (a lower side) of the shock absorber 1, respectively. The first embodiment is a single-tube damping force adjustable hydraulic shock absorber, but can also be applied to a twin-tube damping force adjustable hydraulic shock absorber including a reservoir.

As illustrated in FIG. 1, a piston 3 is slidably fittedly inserted in a cylinder 2. The piston 3 divides the inside of the cylinder 2 into two chambers, a cylinder upper chamber 2A and a cylinder lower chamber 2B. A free piston 201 movable in upward and downward directions in the cylinder 2 is provided in the cylinder 2. The free piston 201 divides the inside of the cylinder 2 into the cylinder lower chamber 2B on the piston 3 side (the upper side) and a gas chamber 202 on a bottom portion side (the lower side). Oil fluid is sealingly contained in the cylinder upper chamber 2A and the cylinder lower chamber 2B as hydraulic fluid. High-pressure gas is sealingly contained in the gas chamber 202 as hydraulic fluid.

Figure 2:
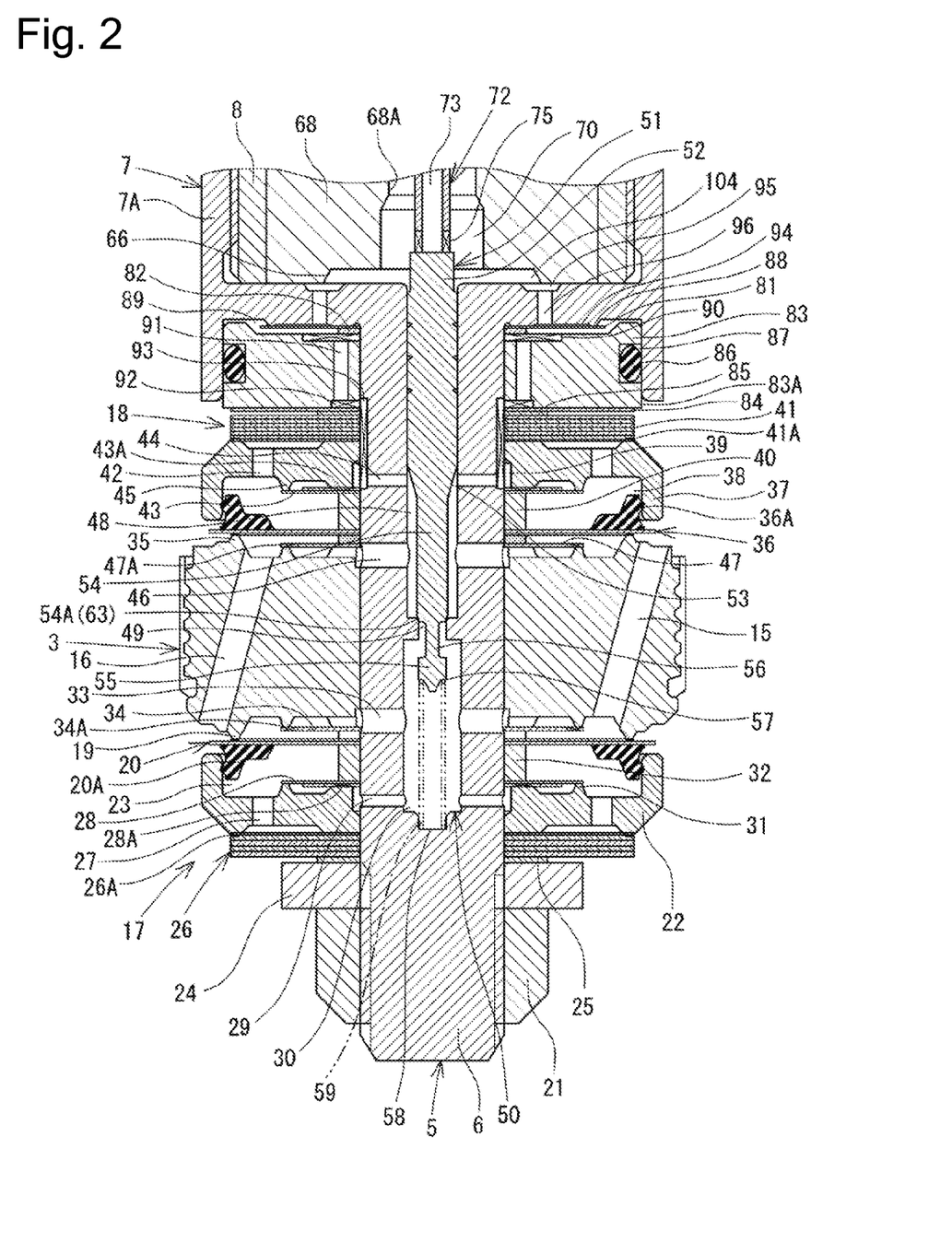
FIG. 2 is an enlarged view illustrating a part of FIG. 1.

A shaft portion 6 of a piston bolt 5 is inserted through a shaft hole 4 of the piston 3. A lower end portion of a generally cylindrical case member 8 is connected to an upper portion of a generally cylindrical head portion 7 of the piston bolt 5 via a screw coupling portion 10. A shaft hole 50 (a common passage) is formed in the piston bolt 5. The shaft hole 50 extends along an axial direction (the upward and downward directions) toward a distal end side (the lower side), and an upper end thereof is opened at a center of a bottom surface of the head portion 7. As illustrated in FIG. 2, the shaft hole 50 includes an axial passage 48, an axial passage 30, and an axial passage 49. The axial passage 48 is formed at an upper portion of the shaft hole 50 and is opened at an upper end thereof. The axial passage 30 is formed at a lower portion of the shaft hole 50. The axial passage 49 establishes communication between the axial passages 30 and 48. A diameter (an inner diameter) of the shaft hole 50 is maximized at the axial passage 30, and is reducing in an order of the axial passage 48 and the axial passage 49.

As illustrated in FIG. 1, a lower end portion of a piston rod 9 is connected to an upper end portion of the case member 8 via a screw coupling portion 11. The piston rod 9 is inserted through a rod guide 200 attached to an upper end portion of the cylinder 2, and an upper end (the other end) thereof extends out of the cylinder 2. A nut 12 is threadably engaged with a lower end portion of the piston rod 9, and the screw coupling portion 11 is prevented from being loosened by bringing the nut 12 into abutment with the upper end of the case member 8 and tightening the nut 12. A small-diameter portion 13 is formed at the lower end of the piston rod 9. An O-ring 14 is placed in an annular groove formed on an outer peripheral surface of the small-diameter portion 13. The O-ring 14 seals between the case member 8 and the piston rod 9. An extension-side passage 15 and a compression-side passage 16 are provided at the piston 3. The extension-side passage 15 is opened at one end (an upper end) thereof to the cylinder upper chamber 2A side. The compression-side passage 16 is opened at one end (a lower end) thereof to the cylinder lower chamber 2B side. An extension-side damping force valve 17 is provided at a lower end of the piston 3. The extension-side damping valve 17 controls a flow of the hydraulic fluid in the extension-side passage 15. A compression-side damping force valve 18 is provided at the upper end of the piston 3. The compression-side damping valve 18 controls a flow of the hydraulic fluid in the compression-side passage 16.

As illustrated in FIG. 2, the extension-side damping valve 17 includes an extension-side main valve 20, a pilot case 22, and an extension-side back-pressure chamber 23. The extension-side main valve 20 is seated on an annular seat portion 19 formed on an outer peripheral side of a lower end surface of the piston 3. The pilot case 22 is fixed to the piston bolt 5 with use of the nut 21. The extension-side back-pressure chamber 23 is formed between a back surface of the extension-side main valve 20 and the pilot case 22. A pressure in the extension-side back-pressure chamber 23 is applied to the extension-side main valve 20 in a valve-closing direction. A washer 24, a retainer 25, and a disk valve 26 are provided between the nut 21 and the pilot case 22 in this order from the lower side. An inner peripheral edge portion of the disk valve 26 is sandwiched between an inner peripheral edge portion of the pilot case 22 and the retainer 25. The extension-side main valve 20 is a packing valve in which an annular seal portion 20A made of an elastic member is in contact with an inner peripheral surface of the pilot case 22 throughout an entire circumference thereof.

The extension-side back-pressure chamber 23 is in communication with the cylinder lower chamber 2B via a passage 27 formed at the pilot case 22 and the disk valve 26. The extension-side back-pressure chamber 23 is in constant communication with the cylinder lower chamber 2B via an orifice 26A formed on the disk valve 26. The disk valve 26 is opened to relieve the pressure in the extension-side back-pressure chamber 23 by releasing the pressure into the cylinder lower chamber 2B when the pressure in the extension-side back-pressure chamber 23 reaches a predetermined pressure. Further, the extension-side back-pressure chamber 23 is in communication with a radial passage 29 formed at the piston bolt 5 via a disk-type extension-side back-pressure introduction valve 28. The radial passage 29 is in communication with the axial passage 30 (the common passage) formed at the piston bolt 5.

The extension-side back-pressure introduction valve 28 is a check valve that permits only a flow of the hydraulic fluid from the radial passage 29 to the extension-side back-pressure chamber 23. The extension-side back-pressure introduction valve 28 is seated on an annular seat portion 31 formed on an inner peripheral side with respect to the passage 27 on an upper surface of the pilot case 22. An inner peripheral edge portion of the extension-side back-pressure introduction valve 28 is sandwiched between the inner peripheral edge portion of the pilot case 22 and a spacer 32. The extension-side back-pressure chamber 23 is brought into communication with the radial passage 29 via an orifice 28A formed on the extension-side back-pressure introduction valve 28 due to opening of the extension-side back-pressure introduction valve 28.

The axial passage 30 is in communication with a radial passage 33 (a compression-side discharge passage) formed at the piston bolt 5. The radial passage 33 is in communication with the extension-side passage 15 via a compression-side check valve 34 provided on the piston 3. The radial passage 33 is in constant communication with the extension-side passage 15 via an orifice 34A formed on the compression-side check valve 34. The compression-side check valve 34 permits only a flow of the hydraulic fluid from the radial passage 33 to the extension-side passage 15.

The compression-side damping valve 18 includes a compression-side main valve 36, a pilot case 37, and a compression-side back-pressure chamber 38. The compression-side main valve 36 is seated on an annular seat portion 35 formed on an outer peripheral side of an upper end surface of the piston 3. The pilot case 37 is fixed to between the head portion 7 of the piston bolt 5 and the piston 3. The compression-side back-pressure chamber 38 is formed between a back surface of the compression-side main valve 36 and the pilot case 37. A pressure in the compression-side back-pressure chamber 38 is applied to the compression-side main valve 36 in a valve-closing direction. The compression-side main valve 36 is a packing valve in which an annular seal portion 36A made of an elastic member is in contact with an inner peripheral surface of the pilot case 37 throughout an entire circumference thereof.

The compression-side back-pressure chamber 38 is in communication with the cylinder upper chamber 2A via a passage 42 formed at the pilot case 37 and the disk valve 41. The compression-side back-pressure chamber 38 is in constant communication with the cylinder upper chamber 2A via an orifice 41A formed on the disk valve 41. The disk valve 41 is opened to relieve the pressure in the compression-side back-pressure chamber 38 by releasing the pressure into the cylinder upper chamber 2A when the pressure in the compression-side back-pressure chamber 38 reaches a predetermined pressure. Further, the compression-side back-pressure chamber 38 is in communication with a radial passage 44 formed at the piston bolt 5 via a disk-type compression-side back-pressure introduction valve 43 and a circumferential groove 39 formed on the inner peripheral surface of the pilot case 37. The radial passage 44 is in communication with the axial passage 48 (the common passage) of the piston bolt 5.

The compression-side back-pressure introduction valve 43 is a check valve that permits only a flow of the hydraulic fluid from the radial passage 44 to the compression-side back-pressure chamber 38. The compression-side back-pressure introduction valve 43 is seated on an annular seat portion 45 formed on an inner peripheral side with respect to the passage 42 on a lower surface of the pilot case 37. An inner peripheral edge portion of the compression-side back-pressure introduction valve 43 is sandwiched between an inner peripheral edge portion of the pilot case 37 and a spacer 40. The compression-side back-pressure chamber 38 is brought into communication with the radial passage 44 via an orifice 43A formed on the compression-side back-pressure introduction valve 43 due to opening of the compression-side back-pressure introduction valve 43.

The axial passage 48 is in communication with a radial passage 46 (an extension-side discharge passage) formed at the piston bolt 5. The radial passage 46 is in communication with the compression-side passage 16 via an extension-side check valve 47 provided on the piston 3. The radial passage 46 is in constant communication with the compression-side passage 16 via an orifice 47A formed on the extension-side check valve 47. The extension-side check valve 47 permits only a flow of the hydraulic fluid from the radial passage 46 to the compression-side passage 16.

A flow of the hydraulic fluid in the shaft hole (the common passage) 50 of the piston bolt 5 is controlled by a pilot valve. The pilot valve includes a valve spool 51 (a valve body) slidably fittedly inserted in the shaft hole 50. The valve spool 51 includes a solid shaft, and forms the pilot valve together with the piston bolt 5. The valve spool 51 includes a base portion 52, a valve portion 54, a distal end portion 55 (a fitting portion), and a connection portion 56. The base portion 52 is slidably fitted to above the axial passage 48, i.e., an upper portion with respect to the radial passage 44. The valve portion 54 is located in the axial passage 48, and is continuously connected to the base portion 52 via a tapered portion 53. The distal end portion 55 is located in the axial passage 30 when the pilot valve is in a closed state (refer to FIG. 2). The connection portion 56 connects the distal end portion 55 and the valve portion 54 to each other. A diameter (an outer diameter) of the valve spool 51 is maximized at the base portion 52, and is reducing in an order of the valve portion 54, the distal end portion 55, and the connection portion 56. Further, the outer diameter of the valve portion 54 is larger than an inner diameter of the axial passage 49.

Figure 3:
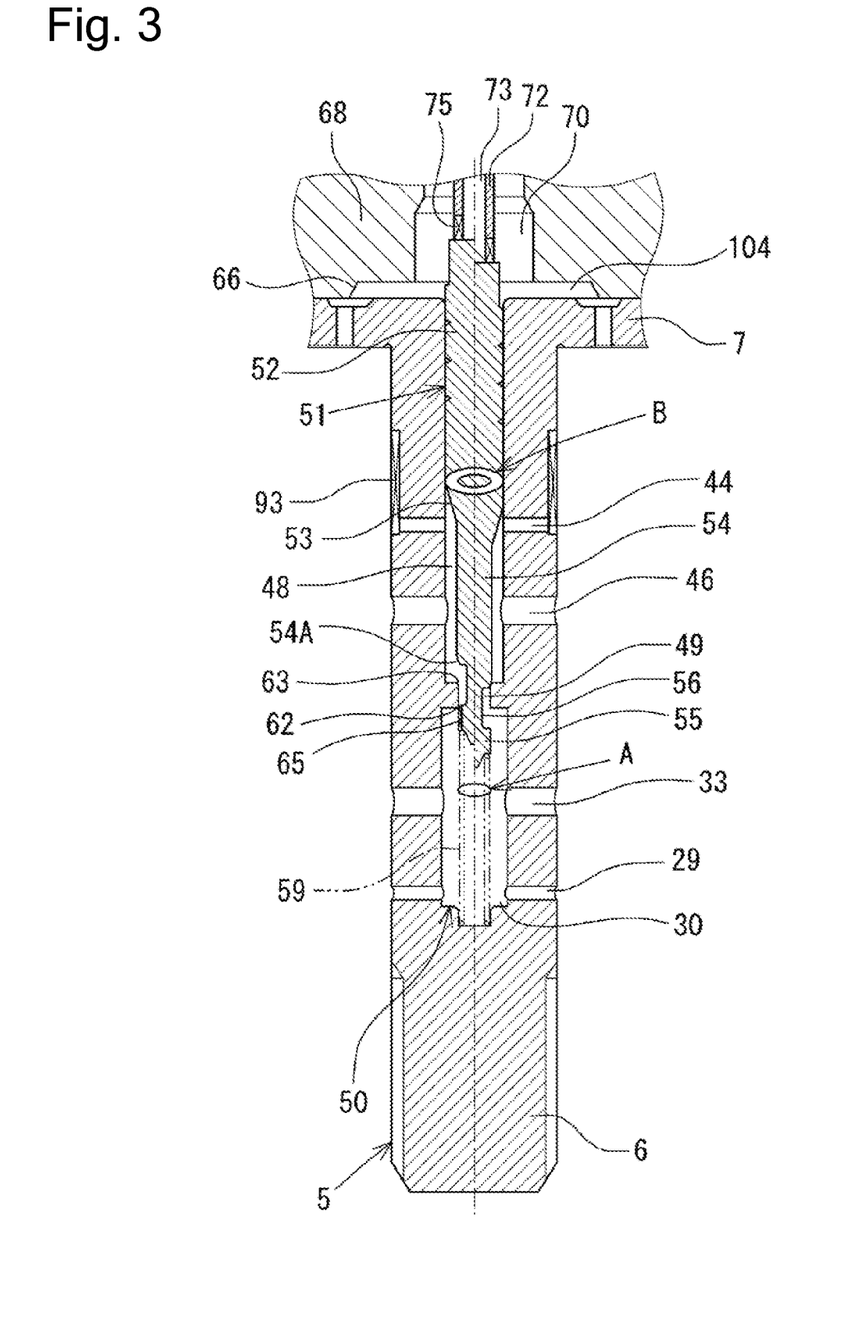
FIG. 3 illustrates actuation of a pilot valve according to the first embodiment, and a right side and a left side of a central line illustrate the pilot valve when the valve is opened and the pilot valve when the valve is closed, respectively.

The valve spool 51 is biased in the upward direction relative to the piston bolt 5 by a valve spring 59 interposed between a spring bearing portion 57 of the distal end portion 55 and a spring bearing portion 58 of the piston bolt 5, by which an end surface of the base portion 52 is brought into abutment with (pressed against) a rod 72 of a solenoid 71, which will be described below. As illustrated in FIG. 3, the distal end portion 55 of the valve spool 51 is formed into a circular shape including a cutout 65 having two flat parallel surfaces in cross section along a plane perpendicular to the axis. The valve spool 51 is stroked in a valve-opening direction (an upward direction in FIG. 3) and the distal end portion 55 thereof is fitted into the axial passage 49 when a control electric current 0 A is supplied to the solenoid 71 used as an actuator for controlling a movement of the valve spool 51 (at the time of a failure). As a result, a pair of orifices 62 establishing communication between the axial passages 30 and 48 is formed between the distal end portion 55 and the axial passage 49.

An annular seat portion 63 is formed at a circumferential edge portion of an opening of an upper end (the axial passage 48 side) of the axial passage 49. The valve portion 54 of the valve spool 51 is seated on the seat portion 63. A seating surface 54A formed in a tapered manner is formed at an outer peripheral edge portion of a lower end (the connection portion 56 side) of the valve portion 54. In a state that the seating surface 54A of the valve spool 51 is seated on the seat portion 63 formed at the axial hole 50 of the piston bolt 5, i.e., the pilot valve is closed, the distal end portion 55 and the tapered portion 53 of the valve spool 51 receive a pressure on the axial passage 30 side on a generally circular pressure-receiving surface A (refer to FIG. 3) and a pressure on the axial passage 48 side on an annular pressure-receiving surface B (refer to FIG. 3), respectively.

As illustrated in FIG. 1, the solenoid 71 includes the case member 8, the rod 72, and a coil 74, and a plunger 69 is coupled with an outer peripheral surface of the rod 72. The plunger 69, which is also referred to as a movable iron core, is generally cylindrically formed with use of a ferrous magnetic member. The plunger 69 generates a thrust force due to generation of a magnetic force from power supply to the coil 74. The rod 72 is cylindrically formed, and includes a rod inner passage 73, which extends through (is formed through) the rod 72 axially (in the upward and downward directions). The rod 72 is supported by a bush 78 installed in a stator core 76 movably in the upward and downward directions (in the axial direction).

A shaft hole 68A is formed at an anchor 68 of the solenoid 71. The shaft hole 68A extends through the anchor 68 axially. A spool back-pressure chamber 70 (a chamber) is formed inside the shaft hole 68A. The upper end of the valve spool 51 and the lower end of the rod 72 are in abutment with each other in the spool back-pressure chamber 70 at the upper end (a one-side end) of the pilot valve. The spool back-pressure chamber 70 is in communication with the cylinder upper chamber 2A via an upper chamber-side communication passage when the pilot valve is closed. The upper chamber-side communication passage is formed by a cutout 75, the rod inner passage 73, a rod back-pressure chamber 101, a passage 102, and an air removal orifice 103. The cutout 75 is formed at a distal end portion (the lower end portion) of the rod 72. The rod back-pressure chamber 101 is formed in the stator core 76. The passage 102 extends radially in the stator core 76 and establishes communication between the rod back-pressure chamber 101 and an outer peripheral surface of the stator core 76. The air removal orifice 103 is formed on a side wall of the case member 8.

As illustrated in FIG. 2, a spool back-pressure relief valve 81 (a check valve), a retainer 82, a washer 83, a disk 84, a retainer 85, and a disk valve 41 are provided between the head portion 7 of the piston bolt 5 and the pilot case 37 in this order from the upper side. An inner peripheral edge portion of the disk valve 41 is sandwiched between the inner peripheral edge portion of the pilot case 37 and the retainer 85. An outer peripheral surface 83A of the washer 83 is fitted to an inner peripheral surface of a lower side of an annular wall portion 7A of the head portion 7 of the piston bolt 5. An annular groove 87 is formed on the outer peripheral surface 83A of the washer. An O-ring 86 is placed in the annular groove 87. The O-ring 86 liquid-tightly seals between the washer 83 and the annular wall portion 7A of the head portion 7 of the piston bolt 5, i.e., a circumferential groove 89, which will be described below, and the cylinder upper chamber 2A.

An inner peripheral edge portion and an outer peripheral edge portion of the spool back-pressure relief valve 81 are sandwiched between the retainer 82 and the inner peripheral edge portion of the head portion 7 of the piston bolt 5, and seated on an annular seat portion 88 formed on the lower surface of the head portion 7 of the piton bolt 5, respectively. The circumferential groove 89 is formed between the head portion 7 of the piston bolt 5 and the washer 83. The cylindrical groove 89 is used as a space for opening the spool back-pressure relief valve 81. The spool back-pressure relief valve 81 is a check valve that permits only a flow of the hydraulic fluid from the spool back-pressure chamber 70 to the cylindrical groove 89.

The spool back-pressure chamber 70 is in communication with the cylinder lower chamber 2B via a lower chamber-side communication passage (a communication passage). The lower chamber-side communication passage includes a cylindrical groove 104. The cylindrical groove 104 is formed around the valve spool 51 (the base portion 52) between a recessed portion 66 on a lower surface of the anchor 68 and the head portion 7 of the piston bolt 5. The lower chamber-side communication passage includes a circumferential groove 95, a circumferential groove 94, and a passage 96. The circumferential groove 95 is formed on the upper surface of the head portion 7 of the piston bolt 5. The circumferential groove 94 is formed inside the seat portion 88 on the lower surface of the head portion 7 of the piston bolt 5. The passage 96 extends in the upward and downward directions in the head portion 7 of the piston bolt 5 and establishes communication between the circumferential grooves 95 and 94. Due to this configuration, the spool back-pressure chamber 70 is in communication with the circumferential groove 89 via the circumferential groove 104, the circumferential groove 95, the passage 96, the circumferential groove 94, and the spool back-pressure relief valve 81.

The lower chamber-side communication passage (the communication passage) includes a groove 90, a groove 92, a passage 91, and a passage 93. The groove 90 is formed on the upper surface of the washer 83, and extends from an inner peripheral surface of the washer 83 radially outward. The groove 92 is formed on the lower surface of the washer 83, and extends from the inner peripheral surface of the washer 83 radially outward. The passage 91 extends in the upward and downward directions in the washer 83 and establishes communication between the grooves 90 and 92. The groove 93 is formed on the outer peripheral surface of the shaft portion 6 of the piston bolt 5 and establishes communication between the radial passage 44 formed at the piston bolt 5 and the groove 92. Due to this configuration, the circumferential groove 89 is in communication with the axial passage 48 via the groove 90, the passage 91, the groove 92, the groove 93, and the radial passage 44. The groove 93 is formed by processing two flat parallel surfaces on the shaft portion 6 of the piston bolt 5.

Next, a flow of the hydraulic fluid will be described with reference to FIG. 2.

During a compression stroke of the piston rod 9 (hereinafter referred to as "during the compression stroke"), the hydraulic fluid in the cylinder lower chamber 2B flows into the cylinder upper chamber 2A by passing through the compression-side passage 16, the orifice 47A of the extension-side check valve 47, the radial passage 46, the axial passage 48, the radial passage 44, the compression-side back-pressure introduction valve 43, the compression-side back-pressure chamber 38, the passage 42 of the pilot case 37, and the orifice 41A of the disk valve 41 before the compression-side main valve 36 is opened.

Then, when the valve spool 51 (the valve body) is moved and the valve portion 54 is separated from the seat portion 63, i.e., the pilot valve is opened, the hydraulic fluid in the cylinder lower chamber 2B flows into the cylinder upper chamber 2A by passing through the compression-side passage 16, the orifice 47A of the extension-side check valve 47, the radial passage 46, the axial passage 48, the axial passage 49, the axial passage 30, the radial passage 33, the compression-side check valve 34, and the extension-side passage 15. Now, a valve-opening pressure of the pilot valve can be adjusted by controlling the electric current to supply to the coil 74 of the solenoid 71. At the same time, a valve-opening pressure of the compression-side main valve 36 can be controlled, because the pressure of the hydraulic fluid introduced from the compression-side back-pressure introduction valve 43 into the compression-side back-pressure chamber 38 is also adjusted.

During an extension stroke of the piston rod 9 (hereinafter referred to as "during the extension stroke"), the hydraulic fluid in the cylinder upper chamber 2A flows into the cylinder lower chamber 2B by passing through the extension-side passage 15, the orifice 34A of the compression-side check valve 34, the radial passage 33, the axial passage 30, the radial passage 29, the extension-side back-pressure introduction valve 28, the extension-side back-pressure chamber 23, the passage 27 of the pilot case 22, and the orifice 26A of the disk valve 26 before the extension-side main valve 20 is opened.

Then, when the valve spool 51 (the valve body) is moved and the valve portion 54 is separated from the seat portion 63, i.e., the pilot valve is opened, the hydraulic fluid in the cylinder upper chamber 2A flows into the cylinder lower chamber 2B by passing through the extension-side passage 15, the orifice 34A of the compression-side check valve 34, the radial passage 33, the axial passage 30, the axial passage 49, the axial passage 48, the radial passage 46, the extension-side check valve 47, and the compression-side passage 16. Now, a valve-opening pressure of the pilot valve can be adjusted by controlling the electric current to supply to the coil 74 of the solenoid 71. At the same time, a valve-opening pressure of the extension-side main valve 20 can be controlled, because the pressure of the hydraulic fluid introduced from the extension-side back-pressure introduction valve 28 into the extension-side back-pressure chamber 23 is also adjusted.

On the other hand, during the extension stroke, the hydraulic fluid in the cylinder upper chamber 2A flows into the spool back-pressure chamber 70 (the chamber) by passing through the upper chamber-side communication passage. More specifically, the hydraulic fluid in the cylinder upper chamber 2A is narrowed down by the air removal orifice 103, and is introduced into the spool back-pressure chamber 70 by passing through the passage 102, the rod back-pressure chamber 101, the rod inner passage 73, and the cutout 75 of the rod 72. The hydraulic fluid introduced into the spool back-pressure chamber 70 flows into the cylinder lower chamber 2B by passing through the lower chamber-side communication passage (the communication passage). More specifically, the hydraulic fluid introduced into the spool back-pressure chamber 70 flows into the cylinder lower chamber 2B by passing through the circumferential groove 104, the circumferential groove 95, the passage 96, the circumferential groove 94, the spool back-pressure relief valve 81 (the check valve), the circumferential groove 89, the groove 90, the passage 91, the groove 92, the groove 93, the radial passage 44, the axial passage 48, the radial passage 46, the orifice 47A of the extension-side check valve 47, and the compression-side passage 16.

Now, the shock absorber discussed in the above-described patent literature, PTL 1 involves a problem of leading to an increase in the axial length of the piston bolt and thus an increase in the total length of the shock absorber because employing the check valve using the coil spring to allow the hydraulic fluid in the spool back-pressure chamber to flow out to the cylinder lower chamber during the extension stroke.

On the other hand, in the first embodiment, the shock absorber 1 causes the hydraulic fluid introduced from the air removal orifice 103 into the spool back-pressure chamber 70 (the chamber) via the rod inner passage 73 to flow into the cylinder lower chamber 2B via the disk-type spool back-pressure relief valve 81 (the check valve) provided in the lower chamber-side communication passage during the extension stroke, thereby being able to acquire a large opening area with a small lift amount of the spool back-pressure relief valve 81 and thereby reduce the entire length of the piston bolt 5 and thus the entire length of the shock absorber 1. Further, the shock absorber 1 establishes the communication between the spool back-pressure chamber 70 (the chamber) and the cylinder lower chamber 2B via the lower chamber-side communication passage (the communication passage), thereby being able to compensate for the volume of the spool back-pressure chamber 70 by an amount corresponding to the movement of the valve spool 51 when the pilot valve is opened, and thus improve responsiveness of the damping force in response to an input to the shock absorber 1.

In the following description, advantageous effects of the first embodiment will be described.

The first embodiment is the shock absorber (1) including the cylinder (2) sealingly containing the hydraulic fluid therein, the piston (3) slidably fittedly inserted in the cylinder (2) and dividing the inside of this cylinder (2) into the cylinder upper chamber (2A) and the cylinder lower chamber (2B), the piston rod (9) having the one end coupled with the piston (3) and the other end extending out of the cylinder (2), the extension-side passage (15) and the compression-side passage (16) provided in the piston (3), the extension-side main valve (20) provided in the extension-side passage (15), the extension-side back-pressure chamber (23) configured to adjust the valve-opening pressure of the extension-side main valve (20), the compression-side main valve (36) provided in the compression-side passage (16), the compression-side back-pressure chamber (38) configured to adjust the valve-opening pressure of the compression-side main valve (36), the common passage (50) configured to establish the communication between the extension-side back-pressure chamber (23) and the compression-side back-pressure chamber (38), the valve body (51) movably provided in the common passage (50), the valve spring (29) configured to bias the valve body (51) in the valve-opening direction, the pilot valve configured to control the flow of the hydraulic fluid in the common passage (50), the actuator configured to control the movement of the valve body (51), the chamber (70) provided on the one-side end of the pilot valve and disposed in communication with the cylinder upper chamber (2A), the communication passage configured to establish the communication between the chamber (70) and the cylinder lower chamber (2A), and the check valve (81) configured to permit the hydraulic fluid in the communication passage to flow into the cylinder lower chamber (2B) during the extension stroke.

According to the first embodiment, the shock absorber 1 causes the hydraulic fluid in the chamber (70) to flow into the cylinder lower chamber (2B) via the check valve (81) during the extension stroke, thereby being able to compensate for the volume of the chamber (70) by the amount corresponding to the movement of the valve body (51) when the pilot valve is opened. As a result, the shock absorber 1 can smoothly actuate the valve body (51), thereby being able to improve the responsiveness of the pilot valve.

Further, in the first embodiment, the shock absorber 1 is configured to acquire the large opening area (a flow passage area) with the small lift amount due to the disk-type check valve (81), thereby being able to reduce a pressure loss when the check valve (81) is opened and thus prevent an increase in the pressure in the chamber (70). Further, compared to when the coil spring-type check valve is used, the shock absorber 1 can reduce the axial length of the pilot valve and thus the entire length of the shock absorber (1), thereby being able to reduce manufacturing cost of the shock absorber 1 along with reducing the size of the shock absorber (1).

Further, in the first embodiment, the communication passage is in communication with the cylinder lower chamber (2B) via the compression-side back-pressure chamber (38), and therefore the cylinder upper chamber (2A) and the cylinder lower chamber (2B) are in communication with each other via the compression-side back-pressure chamber (38). Therefore, the hydraulic fluid in the compression-side back-pressure chamber (38) flows into the cylinder upper chamber (2A) via the chamber (70) during the compression stroke. In this case, the shock absorber 1 can adjust the pressure to generate in the compression-side back-pressure chamber (38) and thus adjust the valve-opening pressure of the compression-side main valve 36 by adjusting the flow of the hydraulic fluid flowing from the compression-side back-pressure chamber (38) into the cylinder upper chamber (2A) via the chamber (70) with use of, for example, an orifice.

Further, according to the first embodiment, the actuator includes the rod (72) configured to move the valve body (51) and the solenoid (71) configured to control the movement of this rod (72). The rod inner passage (73) extending along the axial direction is provided in the rod (72). The chamber (70) and the cylinder upper chamber (2A) are in communication with each other via the rod inner passage (73). Therefore, during the extension stroke, the hydraulic fluid in the cylinder upper chamber (2A) flows into the chamber (70) via the rod inner passage (73), and the hydraulic fluid introduced into the chamber (70) flows into the cylinder lower chamber (2B) via the check valve (81) of the communication passage. Due to this configuration, the shock absorber 1 can prevent the increase in the pressure in the chamber (70), thereby being able to prevent an operational lock due to the increase in the hydraulic pressure in the pilot valve.

Further, in the first embodiment, the valve body (51) includes the solid shaft. Therefore, the shock absorber 1 can reduce (shorten) the diameter of the shaft portion of the piston bolt with the valve attached thereto compared to when a valve body including a hollow shaft, like the shock absorber in the above-described patent literature, PTL 1, is used. As a result, the shock absorber 1 can reduce a clamp diameter on the inner peripheral side of the main valve, thereby reducing a damping force (a valve opening stiffness) on the soft side.

Second Embodiment

Figure 4:
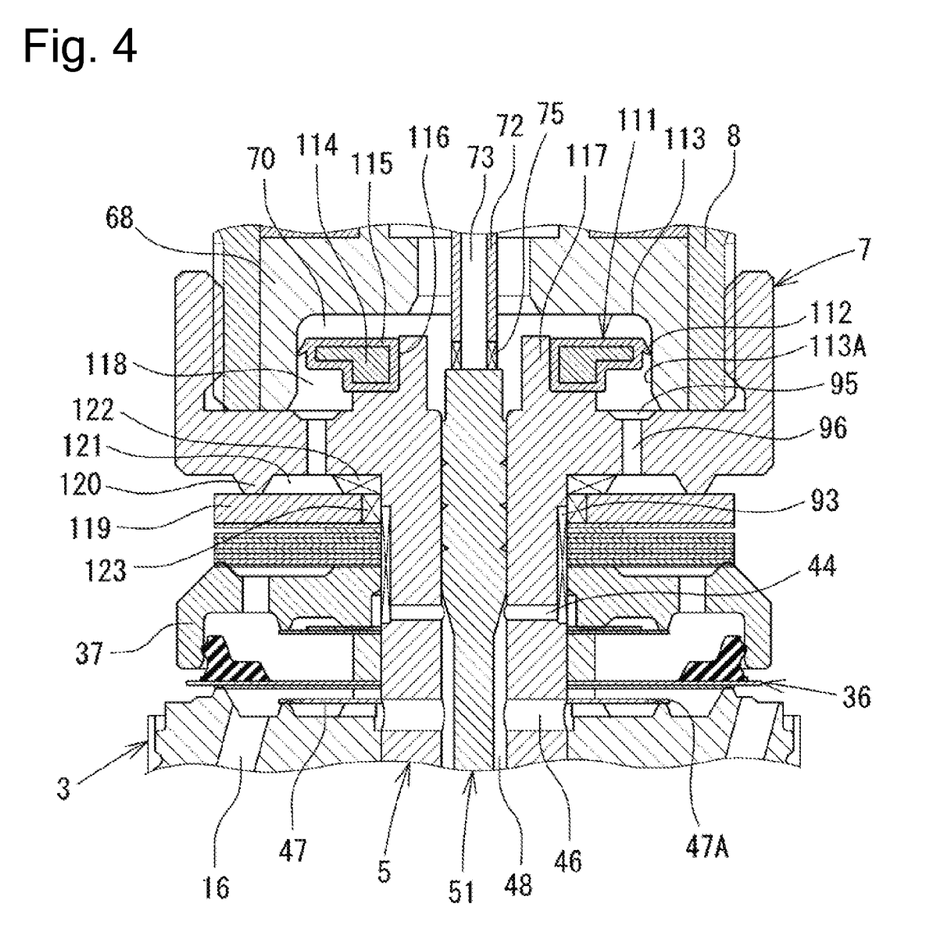
FIG. 4 is an enlarged view illustrating a part of main portions of a shock absorber according to a second embodiment.

Next, a second embodiment will be described mainly focusing on differences from the first embodiment with reference to FIGS. 2 and 4. Portions in common with the first embodiment will be identified by the same names and the same reference numerals.

In the first embodiment, the shock absorber 1 is configured to cause the hydraulic fluid to flow from the spool back-pressure chamber 70 (the chamber) into the cylinder lower chamber 2B by opening the disk-type spool back-pressure relief valve 81 (the check valve) provided between the head portion 7 of the piston bolt 5 and the washer 83 fitted to the lower side of this head portion 7 during the extension stroke. On the other hand, in the second embodiment, a lip portion 112 of a rubber lip 111 provided between the head portion 7 of the piston bolt 5 and the anchor 68 is in abutment with an inner wall surface 113A of a recessed portion 113 opened on the lower surface of the anchor 68 instead of the spool back-pressure relief valve 81 (the check valve) in the first embodiment, as illustrated in FIG. 4.

The rubber lip 111 is formed by baking a rubber 115 to a surface of a washer 114. The rubber lip 111 is attached to the piston bolt 5 by a shaft hole 116 being fitted to a boss portion 117 formed on the inner peripheral side of the upper surface of the head portion 7 of the piston bolt 5. The rubber lip 111 divides a space between the recessed portion 113 of the anchor 68 and the head portion 7 of the piston bolt 5 into the spool back-pressure chamber 70 (the chamber) and a circumferential groove 118. The circumferential groove 118 is in communication with the circumferential groove 95 provided on the upper surface of the head portion 7 of the piston bolt 5.

The annular wall portion 7A of the head portion 7 of the piston bolt 5 extends from the outer peripheral edge portion of the disk portion in both the upward and downward directions in the first embodiment, but extends from the outer peripheral edge portion of the disk portion only in the upward direction in the second embodiment. A washer 119 is provided between the head portion 7 of the piston bolt 5 and the pilot case 37. An inner peripheral edge portion of the washer 119 is sandwiched by the retainer 85 and the inner peripheral edge portion of the head portion 7 of the piston bolt 5. An outer peripheral edge portion of the washer 119 is in abutment with an annular seal portion 120 formed on the lower surface of the head portion 7 of the piston bolt 5. Due to this configuration, a circumferential groove 121 is formed between the head portion 7 of the piston bolt 5 and the washer 119.

Then, in the second embodiment, the hydraulic fluid introduced into the spool back-pressure chamber 70 flows into the cylinder lower chamber 2B by passing through the lower chamber-side communication passage (the communication passage) during the extension stroke. More specifically, the hydraulic fluid introduced into the spool back-pressure chamber 70 pushes and opens the lip portion 112 (the check valve) of the rubber lip 111 (i.e., separates the lip portion 112 from the inner wall surface 113A of the recessed portion 113 of the anchor 68), and flows into the cylinder lower chamber 2B by passing through the circumferential groove 118, the circumferential groove 95, the passage 96, the circumferential groove 121, a radial groove 122 formed at the circumferential edge portion of the head portion 7 of the piston bolt 5, a groove 123 formed at the inner peripheral edge portion of the washer 119, the groove 93, the radial passage 44, the axial passage 48, the radial passage 46, the orifice 47A of the extension-side check valve 47, and the compression-side passage 16.

In this manner, in the second embodiment, the shock absorber 1 can use the washer 119 having a thin plate thickness instead of the washer 83 having a great plate thickness that includes the O-ring 86 attached thereto and includes the passage 91 extending in the upward and downward directions like the first embodiment, thereby being able to further reduce the axial length of the piston bolt and thus reduce the entire length of the shock absorber.

Third Embodiment

Figure 5:
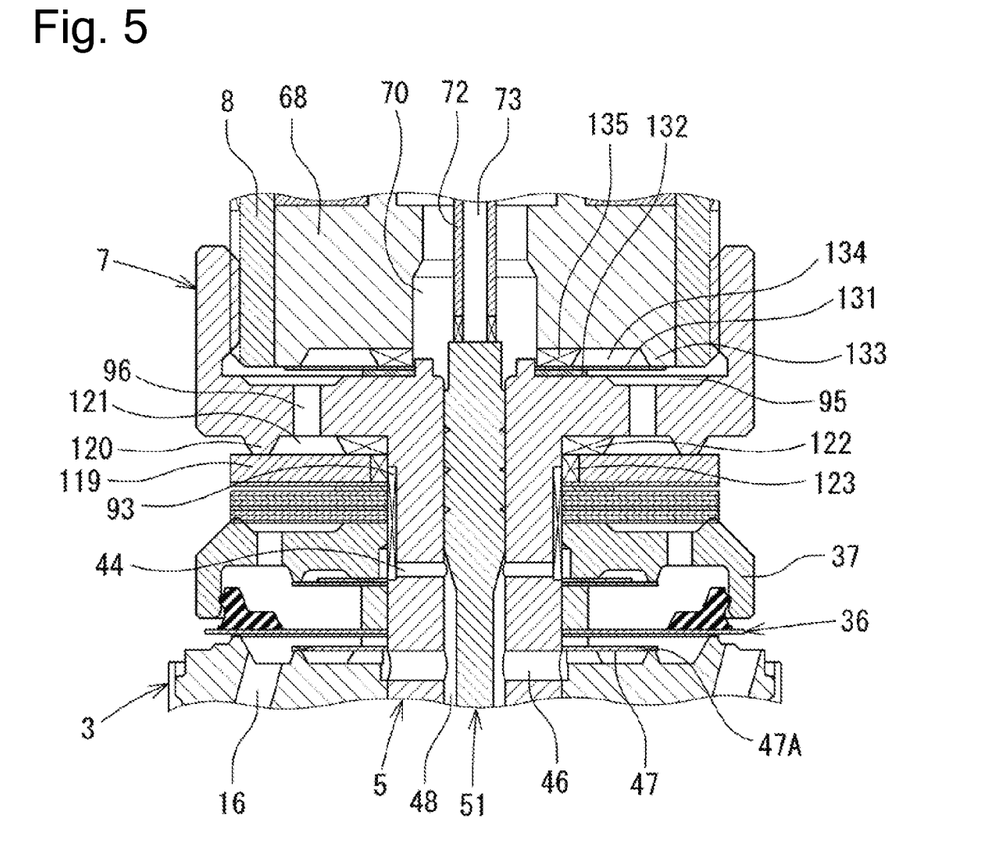
FIG. 5 is an enlarged view illustrating a part of main portions of a shock absorber according to a third embodiment.

Next, a third embodiment will be described mainly focusing on differences from the second embodiment with reference to FIGS. 2, 4, and 5. Portions in common with the first and second embodiments will be identified by the same names and the same reference numerals.

In the second embodiment, the lip portion 112 of the rubber lip 111 provided between the head portion 7 of the piston bolt 5 and the anchor 68 is in abutment with the inner wall surface 113A of the recessed portion 113 opened on the lower surface of the anchor 68 instead of the spool back-pressure relief valve 81 (the check valve) in the first embodiment. On the other hand, in the third embodiment, a disk-type spool back-pressure relief valve 131 (the check valve) is disposed between the anchor 68 and the head portion 7 of the piston bolt 5. An inner peripheral edge portion of the spool back-pressure relief valve 131 is sandwiched by the inner peripheral edge portion of the anchor 68 and a retainer 132. An outer peripheral edge portion of the spool back-pressure relief valve 131 is seated on an annular seat portion 133 formed on the outer peripheral edge portion of the anchor 68. A circumferential groove 134 is formed between the inner peripheral edge portion and the outer peripheral edge portion of the lower surface of the anchor 68.

Then, in the third embodiment, the hydraulic fluid introduced into the spool back-pressure chamber 70 flows into the cylinder lower chamber 2B by passing through the lower chamber-side communication passage (the communication passage) during the extension stroke. More specifically, the hydraulic fluid introduced into the spool back-pressure chamber 70 opens the spool back-pressure relief valve 131 (the check valve) while passing through a radial groove 135 formed at the inner peripheral edge portion of the anchor 68 and the circumferential groove 134, and flows into the cylinder lower chamber 2B by passing through the circumferential groove 95, the passage 96, the circumferential groove 121, the radial groove 122, the groove 123, the groove 93, the radial passage 44, the axial passage 48, the radial passage 46, the orifice 47A of the extension-side check valve 47, and the compression-side passage 16.

In this manner, in the third embodiment, the shock absorber 1 can use the washer 119 having a thin plate thickness instead of the washer 83 having a great plate thickness like the first embodiment, thereby being able to further reduce the axial length of the piston bolt and thus reduce the entire length of the shock absorber, similarly to the second embodiment.

Having described several embodiments of the present invention, the above-described embodiments of the present invention are intended to only facilitate the understanding of the present invention, and are not intended to limit the present invention thereto. The present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority under the Paris Convention to Japanese Patent Application No. 2017-145618 filed on Jul. 27, 2017. The entire disclosure of Japanese Patent Application No. 2017-145618 filed on Jul. 27, 2017 including the specification, the claims, the drawings, and the abstract is incorporated herein by reference in its entirety.

REFERENCE SIGN LIST 1 shock absorber
2 cylinder
2A cylinder upper chamber
2B cylinder lower chamber
3 piston
9 piston rod
15 extension-side passage
16 compression-side passage
20 extension-side main valve
23 extension-side back-pressure chamber
36 compression-side main valve
38 compression-side back-pressure chamber
50 shaft hole (common passage)
51 valve spool (valve body)
70 spool back-pressure chamber (chamber)
71 solenoid (actuator)
81 spool back-pressure relief valve (check valve)

The invention claimed is:

1. A shock absorber comprising:
a cylinder sealingly containing hydraulic fluid therein;
a piston slidably disposed in the cylinder, the piston dividing an inside of this cylinder into a cylinder upper chamber and a cylinder lower chamber;
a piston rod having one end coupled with the piston and the other end extending out of the cylinder;
an extension-side passage and a compression-side passage provided in the piston;
an extension-side main valve provided in the extension-side passage;
an extension-side back-pressure chamber configured to adjust a valve-opening pressure of the extension-side main valve;
a compression-side main valve provided in the compression-side passage;
a compression-side back-pressure chamber configured to adjust a valve-opening pressure of the compression-side main valve;
a common passage configured to establish communication between the extension-side back-pressure chamber and the compression-side back-pressure chamber;
a valve body movably provided in the common passage and a seat portion formed in the common passage;
a pilot valve configured to control a flow of the hydraulic fluid in the common passage by the movement of the valve body;
a valve spring configured to bias the valve body in a valve-opening direction;
an actuator configured to control a movement of the valve body;
a chamber provided on a one-side end of the pilot valve and disposed in communication with the cylinder upper chamber;
a lower chamber-side communication passage configured to establish communication between the chamber and the cylinder lower chamber via the compression-side passage; and
a check valve configured to permit the hydraulic fluid in the lower chamber-side communication passage to flow into the cylinder lower chamber during an extension stroke.

2. The shock absorber according to claim 1, wherein the lower chamber-side communication passage is in communication with the cylinder lower chamber via the compression-side back-pressure chamber.

3. The shock absorber according to claim 2, wherein the actuator includes a rod configured to move the valve body, and a solenoid configured to control a movement of this rod,
wherein a rod inner passage extending along an axial direction is provided in the rod, and
wherein the chamber and the cylinder upper chamber are in communication with each other via the rod inner passage.

4. The shock absorber according to claim 2, wherein the valve body is a solid shaft.

5. The shock absorber according to claim 3, wherein the valve body is a solid shaft.

6. The shock absorber according to claim 1, wherein the actuator includes a rod configured to move the valve body, and a solenoid configured to control a movement of this rod,
wherein a rod inner passage extending along an axial direction is provided in the rod, and
wherein the chamber and the cylinder upper chamber are in communication with each other via the rod inner passage.

7. The shock absorber according to claim 6, wherein the valve body is a solid shaft.

8. The shock absorber according to claim 1, wherein the valve body is a solid shaft.

* * * * *